(12) United States Patent
Abali et al.

(10) Patent No.: US 10,929,569 B2
(45) Date of Patent: *Feb. 23, 2021

(54) METHOD AND SYSTEM FOR STORAGE-BASED INTRUSION DETECTION AND RECOVERY

(71) Applicant: International Business Machines Corporation, Armonk, NY (US)

(72) Inventors: Bulent Abali, Tenafly, NJ (US); Mohammad Banikazemi, New York, NY (US); Dan Edward Poff, Mahopac, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/416,732

(22) Filed: May 20, 2019

(65) Prior Publication Data

US 2019/0272390 A1 Sep. 5, 2019

Related U.S. Application Data

(63) Continuation of application No. 15/846,597, filed on Dec. 19, 2017, now Pat. No. 10,366,252, which is a
(Continued)

(51) Int. Cl.
*G06F 21/64* (2013.01)
*G06F 21/56* (2013.01)

(52) U.S. Cl.
CPC ............ *G06F 21/64* (2013.01); *G06F 21/566* (2013.01); *G06F 2221/2101* (2013.01); *G06F 2221/2115* (2013.01)

(58) Field of Classification Search
CPC ...... G06F 21/64; G06F 12/16; G06F 11/1446; G06F 11/1448; G06F 11/1461
See application file for complete search history.

(56) References Cited

U.S. PATENT DOCUMENTS 6,170,034 B1 1/2001 Weston-Lewis et al.
7,203,962 B1 * 4/2007 Moran .................... G06F 21/52
726/23
(Continued)

OTHER PUBLICATIONS

Iohn D. Strunk, Garth R. Goodson, and Adam G. Pennington Craig A.N. Soules, and Gregory R. Ganger, Intrusion Detection, Diagnosis, and Recovery with Self-Securing Storage, May 2002, CMU-CS-02-140 School of Computer Science Carnegie Mellon University pp. 1-28 (Year: 2002).*

(Continued)

*Primary Examiner* — Ellen Tran
(74) *Attorney, Agent, or Firm* — Daniel P. Morris; McGinn IP Law Group, PLLC

(57) ABSTRACT

An intrusion detection and recovery system includes a copying module that creates a point-in-time copy of a storage level logical unit, the point-in-time copy including a volume copy of the storage level logical unit and a signature of the storage level logical unit, a comparison module that compares at least a portion of the point-in-time copy with a previous copy of the storage level logical unit, a judging module that, based on results of the comparison module, judges if a modification has occurred. A signature of the point-in-time copy is compared with a signature of the previous copy to detect a sign of an intrusion.

20 Claims, 6 Drawing Sheets

Related U.S. Application Data continuation of application No. 12/098,256, filed on Apr. 4, 2008, now Pat. No. 9,928,384, which is a continuation of application No. 10/980,292, filed on Nov. 4, 2004, now Pat. No. 7,506,379.

(56) References Cited

U.S. PATENT DOCUMENTS

| 7,774,844 | B1* | 8/2010 | Chehadeh | H04L 63/1416 |
|---|---|---|---|---|
| | | | | 340/541 |
| 2001/0025347 | A1 | 9/2001 | Thomas et al. | |
| 2001/0037456 | A1 | 11/2001 | Levy | |
| 2003/0079138 | A1 | 4/2003 | Nguyen et al. | |
| 2003/0204609 | A1* | 10/2003 | Anderson | H04L 29/06 |
| | | | | 709/229 |
| 2004/0078561 | A1 | 4/2004 | Zhou | |

OTHER PUBLICATIONS

United States Notice of Allowance dated Mar. 18, 2019, in U.S. Appl. No. 15/846,597.
United States Office Action dated Sep. 19, 2018 in U.S. Appl. No. 15/846,597.
United States Office Action dated May 14, 2018 in U.S. Appl. No. 15/846,597.
United States Office Action dated Feb. 15, 2018 in U.S. Appl. No. 15/846,597.
John D. Strunk, Garth R. Goodson, Adam G. Pennington, Craig A.N. Soules, Gregory R. Ganger, Intrusion Detection, Diagnosis, and Recovery with Self-Securing Storage, May 2002, School of Computer Science Carnegie Mellon University, pp. 1-30.
Office Action in U.S. Appl. No. 12/098,256 dated May 11, 2010.
John D. Strunk, Garth R. Goodson, and Adam G. Pennington, Craig A.N. Soules, and Gregory R. Ganger, Title Intrusion Detection, Diagnosis, and Recovery with Self-Securing Storage, May 2002, CMU-CS-02-140, School of Computer Science, Carnegie Mellon University, pp. 1-28.
Office Action in U.S. Appl. No. 12/098,256 dated Oct. 19, 2010.
Office Action in U.S. Appl. No. 12/098,256 dated Apr. 20, 2012.
Office Action in U.S. Appl. No. 12/098,256 dated Oct. 9, 2012.
Office Action in U.S. Appl. No. 12/098,256 dated May 3, 2016.
Office Action in U.S. Appl. No. 12/098,256 dated Oct. 31, 2016.
Office Action in U.S. Appl. No. 12/098,256 dated Mar. 27, 2017.
Office Action in U.S. Appl. No. 12/098,256 dated Apr. 12, 2017.
Notice of Allowance in U.S. Appl. No. 12/098,256 dated Nov. 16, 2017.

* cited by examiner

METHOD AND SYSTEM FOR STORAGE-BASED INTRUSION DETECTION AND RECOVERY

The present application is a Continuation Application of U.S. patent application Ser. No. 15/846,597, filed on Dec. 19, 2017, which is a Continuation Application of U.S. patent application Ser. No. 12/098,256, filed on Apr. 4, 2008, now U.S. Pat. No. 9,928,384, issued on Mar. 27, 2018, which is a Continuation Application of U.S. patent application Ser. No. 10/980,292, filed on Nov. 4, 2004, now U.S. Pat. No. 7,506,379, issued on Mar. 17, 2009, the entire contents of which are incorporated herein by reference.

BACKGROUND OF THE INVENTION

Field of the Invention

The present invention relates to a method (and system) for protecting a computer system against the manipulation of data stored in a data storage arrangement of the microcomputer system. In particular, the present invention describes a method (and system) for monitoring accesses to a data storage system and detecting an intrusion or any other intentional or unintentional unwanted modification to persistent data stored in the storage system. Furthermore, the present invention relates to a method (and system) for recovering data if an unwanted modification is detected.

Description of the Related Art

Typically, intrusion detection methods and systems are used to protect data stored in a computer from unwanted modifications, which compromise the computer system. Unwanted modifications include, for example, intentional or unintentional modifications to the stored data, as well as intrusions.

Conventional systems and methods have been developed for detecting when someone has compromised a computer system. Conventional intrusion detection methods (and systems include network-based intrusion detection and host based intrusion detection. Network-based methods detect intrusions in the networking systems, and include programs that search for suspicious activity in a network by monitoring the traffic on a network. Host-based methods, on the other hand, include software that monitor the activity of a host system and detect an intrusion on a particular machine (e.g., local memories, hard discs, etc.). While these approaches can be effective, they can be easily compromised in many ways. Once the host system is compromised, intrusions may go unnoticed and permanent damage can be done to the system and the data it contains.

One of the components of a computer system which is less likely to be compromised is the storage system. Since these systems are exposed to the outside world through a narrow applications programming interface (API) and their architecture is not as well known to the general public as that of host systems, storage systems provide a good place to provide protection against intrusion. Storage systems detect changes to persistent data and therefore can detect several types of intrusions, especially those which persist across boots.

Storage systems are particularly suited for detecting intrusions because they interface to the "outside world" in a limited way, for example through the small computer systems interface (SCSI) command set which is a standard defined for connecting peripheral devices such as CD-ROM drives to computers and are not as easily compromised themselves.

Intrusion detection techniques can be deployed in various storage systems. For example, intrusions can be detected at block storage level and in storage area network (SAN) devices, such as the SAN volume controller (SVC) and Enterprise Storage System (ESS).

There are several important advantages to using storage-based intrusion detection systems. As mentioned above, storage devices are not readily accessible. It is easy to break into a CPU through a network. For example, in an Enterprise Storage System using a SAN, multiple client machines/servers are connected to a single storage system. The servers/machines can be easily compromised, but the storage devices are not easily accessed by intruders.

During an intrusion, something (e.g., a file) in the computer system will be modified. In particular, an intrusion will negatively affect the computer system. Many significant intrusions will cause a change inside of the storage device. The storage device is a good place to look for intrusions because most intrusions to the servers/machines will have an impact on the storage device, but the storage device itself is not easily accessible to an intrusion.

Conventional systems have been developed for intrusion detection in file servers or for memory, but there has been no solution for block storage systems.

One conventional system for content protection in non-volatile storage devices, creates signatures of regions of a storage system and then, once in a while (e.g., at reboot time), recreates the signatures. If anything has changed in the recreated signatures, then the system concludes that an unauthorized access has occurred.

In this system, however, if it is desired to recover the content prior to the intrusion, then one needs to have saved a copy of the regions of interest. This requires the user to make copies of the entire volume of the storage device. Copying the entire volume cannot be done frequently because it takes a considerable amount of time. If, however, the copies are not made regularly the content that the user can recover once an unauthorized access is discovered is very old and out of date.

This conventional system has been proposed for protecting the content of non-volatile memory (NVRAM) which is much smaller than a typical storage system. This system is not usable, however, for protecting a larger storage system.

An additional shortcoming of this device is that if one creates signatures for a large storage system, calculating the signature will be too costly and time consuming. To address this, the conventional system proposes that the storage system is divided into regions and signatures are created for only those regions of interest. This method cannot work for storage devices where file systems are stored and a location of a file that a user is interested in changes or, for example, an increase in the size of a file is acceptable. Therefore, this conventional system is essentially usable for protecting NVRAM and complementary metal oxide semiconductor (CMOS) memories, and not secondary storage systems with disks.

Prior to the present invention, there have been no storage-based intrusion detection methods or systems not implemented in file servers that monitor modifications to files and not only to memory regions. This provides a great benefit as data blocks of a file can be scattered around and also can change location in time because of computer system operations, such as disk defragmentation. Systems where access rules are defined for memory regions will be ineffective in such environments.

Furthermore, in conventional devices, in order to recover compromised data after an intrusion or any other possible source of unwanted change, it is necessary to have made a complete volume copy of data regions that the user desires to recover. While this may be practical in a small storage system such as the computer CMOS NVRAM, it would require a significant amount of additional storage for storage systems. Additionally, since the volume copy is not generated periodically in the conventional systems, even when a volume copy exists, it can be very outdated.

Thus, prior to the present invention, there has been no intrusion detection method (and system) where periodic point-in-time copies are made so that the user will always have a recent copy to fall back to when an intrusion is detected. Further, there has been no intrusion detection method and system that performs periodic copies in a large storage system.

SUMMARY OF THE INVENTION

In view of the foregoing and other exemplary problems, drawbacks, and disadvantages of the conventional methods and structures, an exemplary feature of the present invention is to provide a method and system for detecting intrusions in stored data by creating time and space efficient point-in-time copies of a logical unit (LUN).

In a first aspect of the present invention, a method (and system) for detecting intrusions to stored data, includes creating a point-in-time-copy of a logical unit, and comparing at least a portion of the point-in-time-copy with a previous copy of the logical unit. The point-in-time copy may include a volume copy of the logical unit or a signature of the logical unit. Additionally, the point-in-time copy may include one or more signatures of one or more portions of the logical unit. A signature is a function of a file which is usually much smaller than the file. One can create the signature of the file, or the portion of the file, and then from the new copy create a new signature and then compare these two signatures.

In a second aspect of the present invention, an intrusion detection system, includes a storage system, the storage system including a unit that detects an intrusion at a file system level, independent of a host system.

In a third aspect of the present invention, a computer system for detecting intrusions to stored data, includes means for creating a point-in-time copy of a logical unit, and means for comparing at least a portion of the point-in-time copy with a previous copy of the logical unit.

In a fourth aspect of the present invention, a signal-bearing medium tangibly embodying a program of machine readable instructions executable by a digital processing apparatus to perform a method for detecting intrusions to stored data including creating a point-in-time copy of a logical unit, and comparing at least a portion of the point-in-time copy with a previous copy of the logical unit.

In a fifth aspect of the present invention, a method for deploying computing infrastructure, includes integrating computer-readable code into a computing system, wherein the compute readable code in combination with the computing system is capable of performing a method for detecting intrusions to stored data, wherein the method for detecting intrusions to stored data includes creating a point-in-time copy of a logical unit, and comparing at least a portion of the point-in-time copy with a previous copy of the logical unit.

In a sixth aspect of the present invention, an intrusion detection and recovery system includes a copying module that creates a point-in-time copy of a logical unit, and a comparison module that compares at least a portion of the point-in-time copy with a previous copy of the logical unit.

In a seventh aspect of the present invention a storage system includes at least one data storage unit and an intrusion detection and recovery system that detects an intrusion at a file system level, independent of a host system.

In an eighth aspect of the present invention a computer system includes, at least one client machine, and at least one storage system, wherein the storage system includes at least one data storage unit and an intrusion detection and recovery system for detecting an intrusion at a file system level, independent of a host system.

In a ninth aspect of the present invention a method (and system) for detecting intrusions to stored data, includes creating a point-in-time copy of a logical unit, where the point-in-time copy includes logical unit information, and comparing at least one of the point-time-copy and the logical unit information with a previous copy of the logical unit.

Unlike conventional intrusion detection methods discussed above, the present invention periodically copies storage logical units (LUNs) of interest (through fast and space efficient flash copy operations) and then monitors the copies to detect if any unwanted modification has been made. Meanwhile, there is no interruption of service and the original LUNs can be accessed without any limitations by the client machines or servers. The copying process is done such that there is always one "good" copy of the LUNs of interest. The frequency of making copies can be set at any predetermined interval by the system administrators. The higher the frequency, the faster an intrusion can be detected and the more recent and up to date the recovered data is.

An advantage of the present invention is that it provides a method and system that makes periodic copies so that the user will always have a recent copy to fall back to when an intrusion is detected. Another advantage of the present invention is that it performs periodic copies in a large storage system.

Thus, the present invention provides a method (and system) for detecting intrusions to stored data that operates at a file system level, independently of a host system. This would provide a system with much better protection and recovery from possible intrusions.

BRIEF DESCRIPTION OF THE DRAWING

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
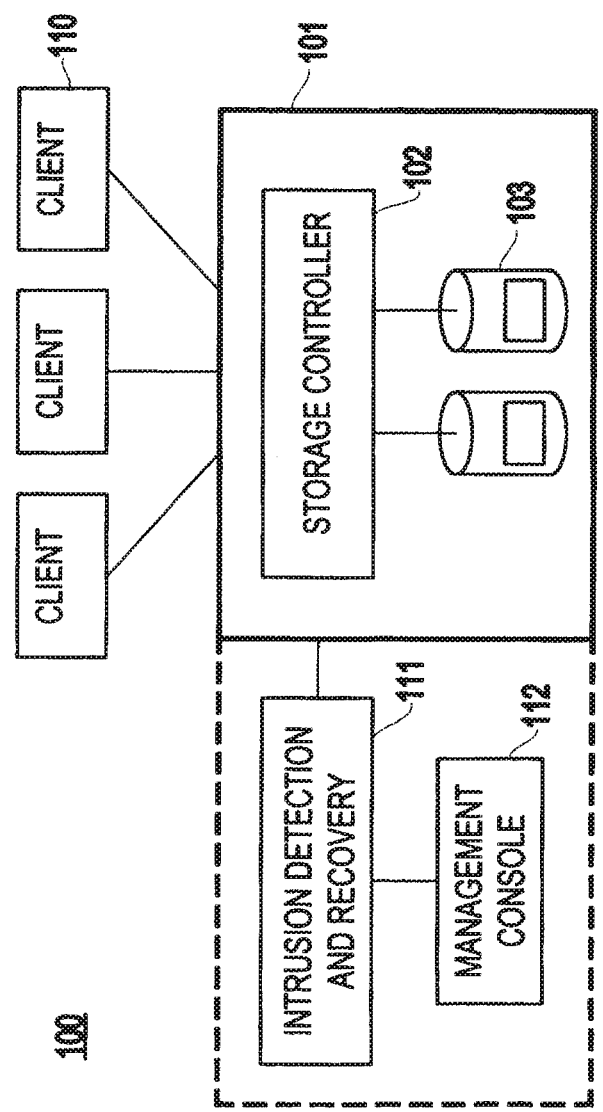
FIG. 1 illustrates a block diagram of an example of the system 100 of interest for the present invention.

Referring now to the drawings, and more particularly to FIGS. 1-8, there are shown exemplary embodiments of the method and structures according to the present invention.

The computer system of interest includes of one or more client systems, a storage system, and an intrusion detection system. The storage system is made of a control unit and storage devices. The control unit performs tasks such as management and virtualization of storage devices. It can also implement various abstractions such as RAID. Storage devices are hard disks and other types of devices that can store data. The intrusion detection system can be either integrated into the storage system and be a part of it or a separate system, connected to the storage system. The intrusion detection system performs tasks such as monitoring accesses and detecting intrusions and responding to them. The intrusion detection system also possibly has a console through which system administrators can program it and receive various reports securely.

FIG. 1 depicts an environment 100 of an exemplary intrusion detection system. Client machines 110 (CPUs, servers, etc.) are each connected to a storage system 101. The client machines 110 and the storage system 101 form an enterprise storage system arranged as a storage area network (SAN). The storage system 101 includes at least one logical unit (LUN) 103, where data is stored, and a storage controller 102. The storage controller 102 is a CPU that acts as the brain of the storage system 101 and controls the functions of the storage system 101. The storage system 101 depicted in FIG. 1 includes two LUNs 103, but may include as many LUNs as necessary to accommodate the stored data. Each LUN 103 may represent any number of storage devices. The LUN may comprise any type of storage device, including but not limited to magnetic hard discs, optical hard discs, and magnetic tapes.

An intrusion detection and recovery system (IDS) 111 is connected to the storage system 101. As depicted in FIG. 1, the intrusion and detection system 111 is external to the storage system 101. However, the IDS 111 may be located internal to the storage system 101 as well. In other words, the IDS 111 can be run on a different machine connected to the storage system 101 or may run on the same machine. Also, depending on the number of LUNs 103 contained in the storage system 101, the storage system 101 could be connected to several IDSs 111.

A management console 112 is coupled to each of the intrusion detection and recovery systems 111. The management console 112 instructs the IDS, for example, as to which files in the LUNs 103 should not be modified or that should not be decreased in size. The management console 112 preferably is a secure console that is only accessible by system moderators or administrators and not by client users.

Figure 2:
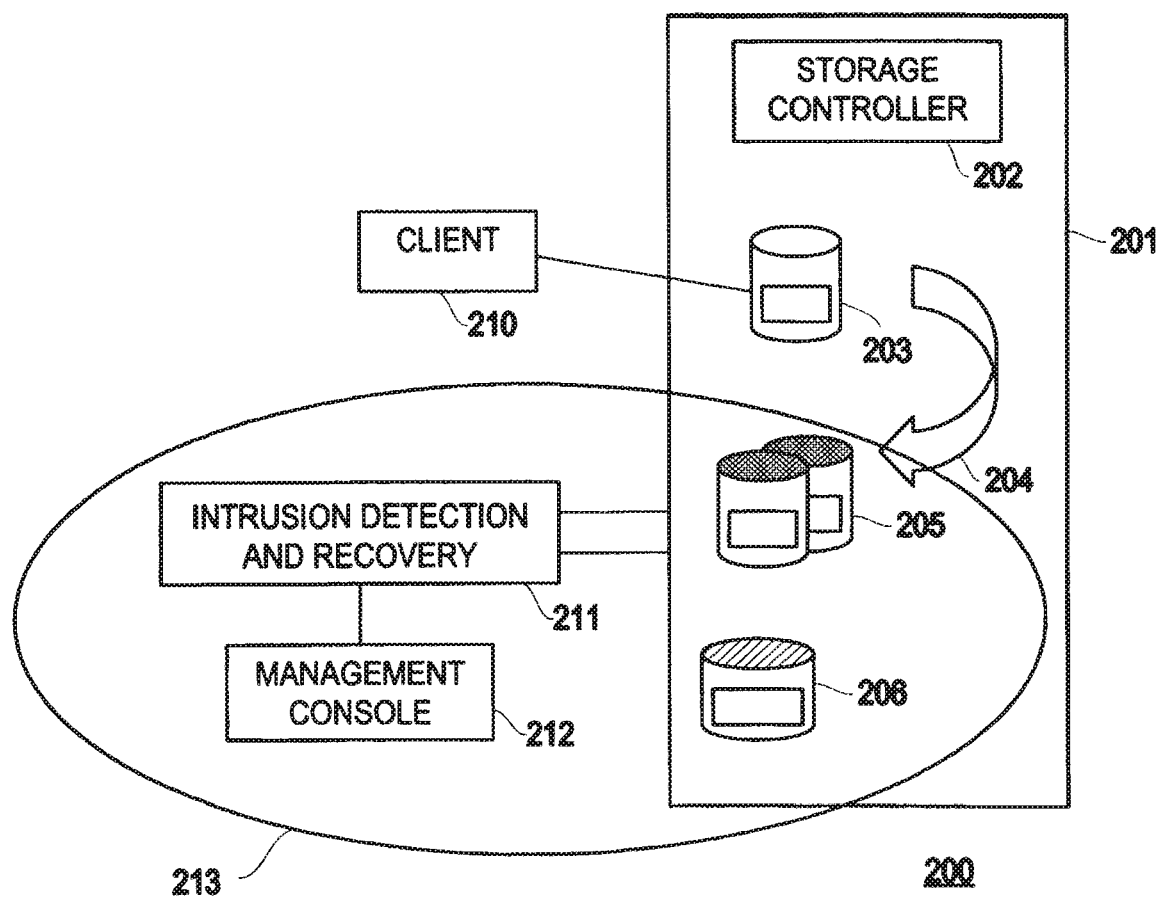
FIG. 2 illustrates a block diagram of an exemplary embodiment of the system 200 of the present invention.

FIG. 2 depicts an intrusion detection and recovery system 211 according to an exemplary embodiment of the present invention. A client machine/server 210 is connected to a storage system 201. FIG. 2 depicts a single client machine/server 210. However, multiple clients can be coupled to the server 210. Copies 205 are made periodically 204, depending on the number of LUNs. The larger the number of LUNs, the longer it takes to make point-in-time copies 205 and to run a comparison of the copies, and thus the longer the amount of time between each copying function 204. However, more than one IDS 211 may be used to reduce the period of time between each copy.

In addition to making full copies 205 of each of the LUNs 203, the full copies 205 are converted into signatures 206, which may also be used for comparison purposes. The signatures 206 contain complete or partial copies of only specific files of interest as opposed to the full copies 205, which include a copy of the entire volume of each LUN 203. Thus, comparing the signatures 206 is less time consuming and more efficient, because there is no need to compare the entire storage device, but only the specific files.

According to an exemplary embodiment of the present invention, the copies 205 include time and space efficient point-in-time copies which are continuously made by the copy operation 204 provided by the storage system 201. Copies are preferably only made of volumes of interest in each of the LUNs 203. The volumes of interest are volumes that contain files having access rules defined for them.

An intrusion detection and recovery system (IDS) 211 is connected to the storage system 201. As depicted in FIG. 2, the intrusion and detection system 211 is external to the storage system 201. However, as mentioned above, the IDS 211 may be located internal to the storage system 201 as well. In other words, the IDS 211 can be run on a different machine connected to the storage system 201 or may run on the same machine. Also, depending on the number of LUNs 203 contained in the storage system 201, the storage system 201 could be connected to several IDSs 211;

A management console 212 is coupled to each of the intrusion detection and recovery systems 211. The management console 212 instructs the IDS for example as to which files in the LUNs 203 should not be modified, should not be decreased in size, etc.

The management console 212, the IDS 211, the full copies 205 and the signatures 206 are all maintained in a secure perimeter 213. The secure perimeter prevents outside access to the components inside. The clients 210 do not have access to the secure perimeter 213. Access to the secure perimeter is limited to system administrators and other authorized people. The secure perimeter 213 prevents intruders from accessing and altering the copies 205 or the signatures 206.

The secure perimeter 213 is created by connecting the IDS and the management console 212 to the storage system 201 using fiber channels. There are several methods for creating a secure perimeter 213, one of which includes using various zoning techniques in fiber channel networks. The present invention is not limited by this feature and the secure perimeter 213 may be created by any conventionally known means, including a firewall or other similar forms of access prevention.

Figure 3:
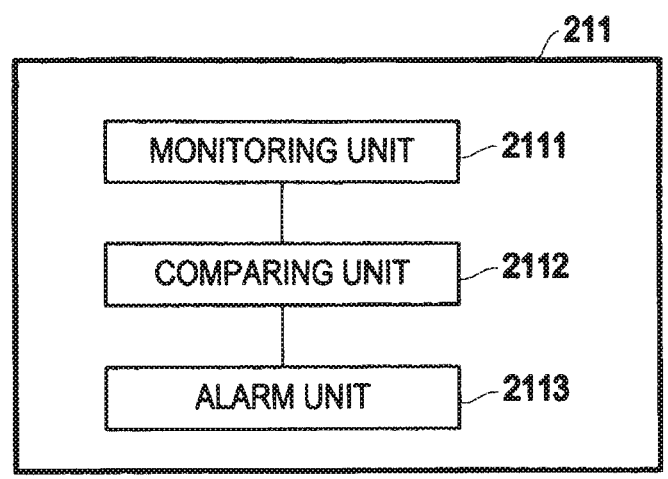
FIG. 3 illustrates a block diagram of an intrusion detection and recovery system 211 of an exemplary embodiment of the present invention.

FIG. 3 depicts a block diagram of the intrusion detection system 211. The intrusion detection system 211 carries out several operations including, but not limited to, making the copies 205 and the signatures 206 of the LUNs and running a comparison of the copies 205 and the signatures 206. The intrusion detection system 211 includes a monitoring unit 2111, a comparing unit 2112 and an alarm unit 2113. The monitoring unit 2111 monitors the storage system 201 for intrusions. The comparing unit 2112 copies the LUNs 203 and compares the copies 205 and the signatures 206. The alarm unit 2113 notifies the moderator or administrator of the system that an intrusion or unwanted modification has occurred.

Figure 4:
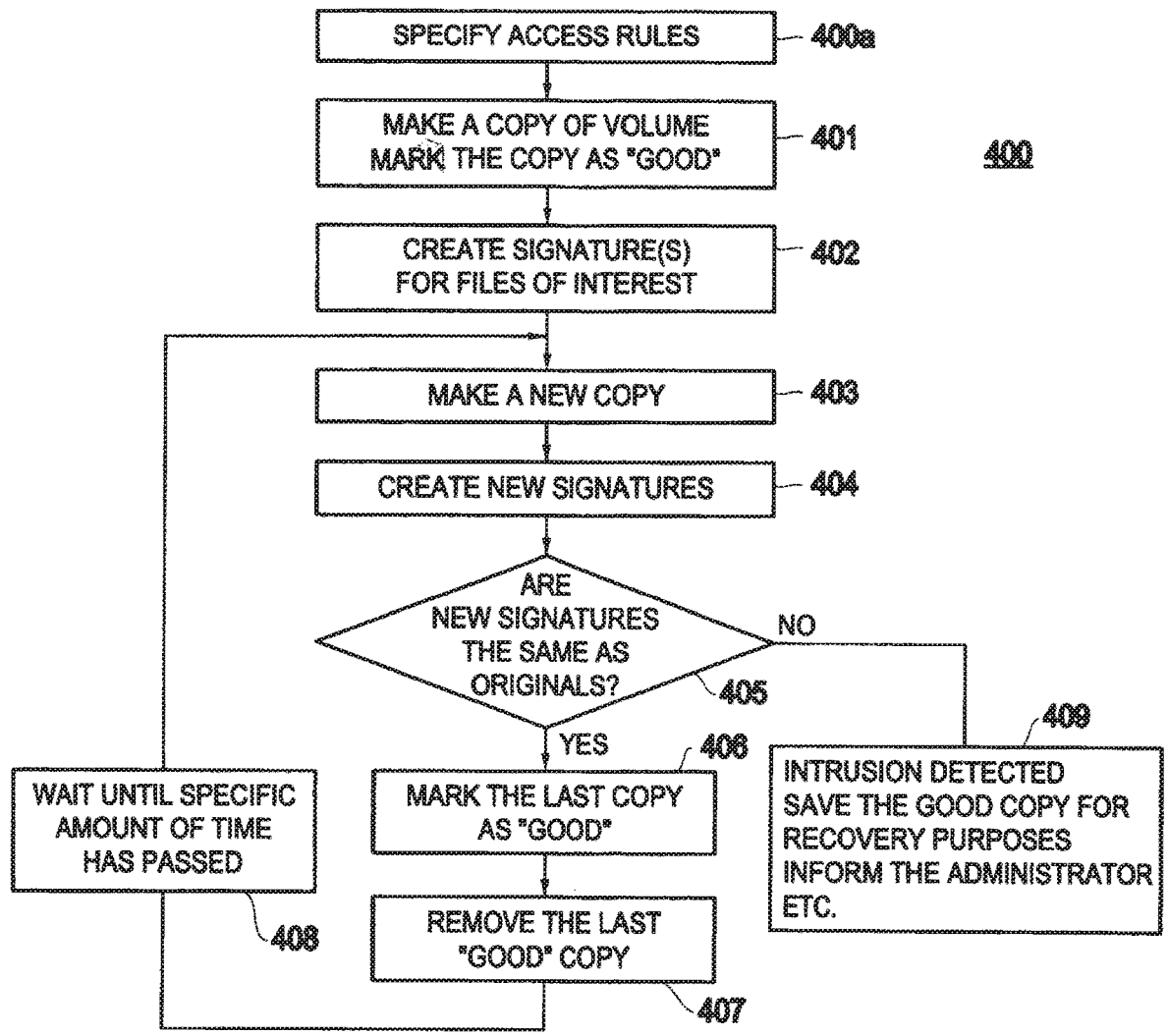
FIG. 4 is a flow diagram illustrating an exemplary embodiment of the method of the present invention.

FIG. 4 is a flow diagram illustrating one exemplary embodiment of a method 400 of the present invention.

According to this exemplary embodiment of the present invention, access rules are defined (step 400a) for one or more files in one or more of the LUNs 203 accessed by client systems 210. The access rules are defined (step 400a) for the IDS 211 through the secure console 212. The access rules specify the types of actions that the client systems 210 are allowed to perform and the types of actions that are to be treated as a sign of an intrusion. For example, appending the content of a file can be allowed while changing access permissions for a file can be specified as a sign of intrusion. In other words, a client system 210 may be given access to alter or append the data contained in the file, but will not be able to alter or append the metadata associated with the file. The metadata includes information such as access permissions, location of the file, the date of when the file was created, etc.

The storage system 201 then makes a copy 205 of each of the LUNs 203 and marks the copy 205 as a "good" copy (step 401). A "good" copy is defined as a copy having no intrusions or unwanted modifications. Copies are not made in real time because the client systems 210 are constantly updating the data in the storage devices 203. The storage system 201 cannot check the actual LUNs 203 for intrusions and unwanted modifications at file system level because the LUNs 203 are constantly being updated by the clients. The copies 205 must be made instantaneously so that the copies 205 can be made while a client system 210 is changing data in the storage device 203.

According to an exemplary embodiment of the present invention, time and space efficient point-in-time copies are made. The point-in-time copies 205 are similar to "flash copies". Because the point-in-time copies 205 are made instantaneously, the present method avoids coherence problems in the stored data. Furthermore, other techniques for synchronization between client machines and a storage system can be used to guarantee a file system consistency for cases where the file system is not journal based and cannot recover from power failure-like states.

Based on the access rules, a signature 206 for each file of interest is created (step 402) and stored in the storage system 201 where it can be accessed only by the IDS and not the client systems. Signatures can be some form of encoding of data and metadata of a file or even a complete copy of the file and its metadata.

A new copy the LUN 203 is then made (step 403) and stored in the storage system 201. A signature 206 is then created (step 404) for the new copy of the LUN 203 and is also stored in the storage system 201.

Next the signatures for the files that are being monitored (those defined by the access rules) are compared (step 405). In other words, the signature 206 of the new copy is then compared with the signature 206 of the previous copy 205. If the new signature is identical to the previous signature, then no sign of intrusion is detected. If, however, the new signature is not identical to the previous signature, then an intrusion may have occurred.

Once an occurrence of an intrusion, or other unwanted modification, is detected, the last "good" copy is saved to the storage system and the system administrator is informed of the intrusion (step 409). The last "good" copy is saved so that the most recent data, having no intrusions, can be recovered. The last "good" copy comprises the previous copy, or the last copy 205 made having no intrusions.

If no intrusions are detected, then the new copy (or most recent copy) is marked as the "good" copy (step 406). The previous "good" copy is then removed from the storage system (step 407). After a specified duration of time the process is started again (step 408) and another new copy is made and compared to the most recent "good" copy.

As an example, the time duration between copies may be set at a predetermined duration (e.g., every 15 minutes). This means that a new copy is made every 15 minutes. For example, a first copy of the LUN 203 is made at 10:15 and no intrusions are found. This copy is now marked as a "good" copy and saved for comparison with the next new copy. A new copy is made at 10:30 and the signatures of the new copy are compared to the signatures of the previous "good" copy. During the comparison, no intrusions are found. Therefore, the copy made at 10:30 is now marked as the "good" copy and the previous "good" copy (the copy made at 10:15) is removed from the storage system 201. Another new copy is made at 10:45 and the signatures are compared to the "good" copy made at 10:30. An unwanted modification or intrusion is detected in the new copy made at 10:45. The copy made at 10:45 is then removed from the storage system 201, and the storage system 201 resorts back to the "good" copy made at 10:30 and is used for data recovery. The method according to the present invention ensures that one "good" copy is always saved to revert back to for data recovery.

According to an exemplary embodiment of the present invention, a "good" copy of the LUN 203 of interest is always saved such that if and when an intrusion is detected, compromised data can be recovered. A copy 205 is called "good" when it passes the IDS 211 examination and no violation is detected. Keeping such a copy 205 requires that the IDS 211 can create at least two copies 205 of a LUN 203. When a copy 205 is recognized as "good", it is not deleted until the next periodic copy 205 is created, examined and recognized as "good". When a new "good" copy is created, older "good" copies can be discarded and the process of creating new copies 205 and examining them continues. A system administrator can set the frequency of the copy and comparison operations. A smaller delay between the creation of each copy 205 leads to more frequent copies 205 and examination of data. Intrusions are detected in less time from the occurrence of the intrusions, which allows the system 201 to reduce the amount of data that is lost after an intrusion occurs.

Once a violation is detected, the "good" copy is protected, inside of the secure perimeter 213, for future reference and for recovery of compromised data. For example, the "good" copy can be used to recover the compromised file and to copy the file to the original LUN 203 once the source of the intrusion is detected and disabled. Alternatively, the storage system 201 may block any further access to the LUNs 203 of interest until the problem is solved. Also, a versioning system may be used such that every copy of the data blocks is preserved until the source of the intrusion is detected and disabled.

As discussed above, a space efficient point-in-time copy operation 204 is used for copy operations. These copy operations do not require the actual copy of data blocks at the time of the creation of the copy. The copy operations are performed on one single LUN 203 or a group of LUNs 203. When the copy 205 is created, an internal data structure is set up so that reads from data blocks of the LUN copy 205 are translated to reads from the original LUN 203. When a data block from the original LUN 203 is written to, that block is first copied to another location such that future references to the corresponding block in the copy 205 are performed correctly. When a block from the LUN copy 205 is written to for the first time, the relationship between the copy 205 and original LUN 203 for the specific block is broken. Since the point-in-time copy operation 204 is space efficient (that is, data is not physically copied), the copy 205 is created almost instantaneously and with negligible overhead and minimal storage traffic. This makes it possible to perform the copy operation 204 periodically and on a large number of LUNs 203. Also, the newly created copy 205 may be mounted on and examined at file level.

Modern SAN storage systems, which support point-in-time copy operations, usually support the notion of consistency groups. A consistency group is made of two or more LUNs 203 and operations such as a point-in-time copy on any of the LUNs 203 operate on all members of the group. This provides the added benefit of support for file systems which include more than one LUN 203 and also large database stores.

Second Embodiment

Figure 5:
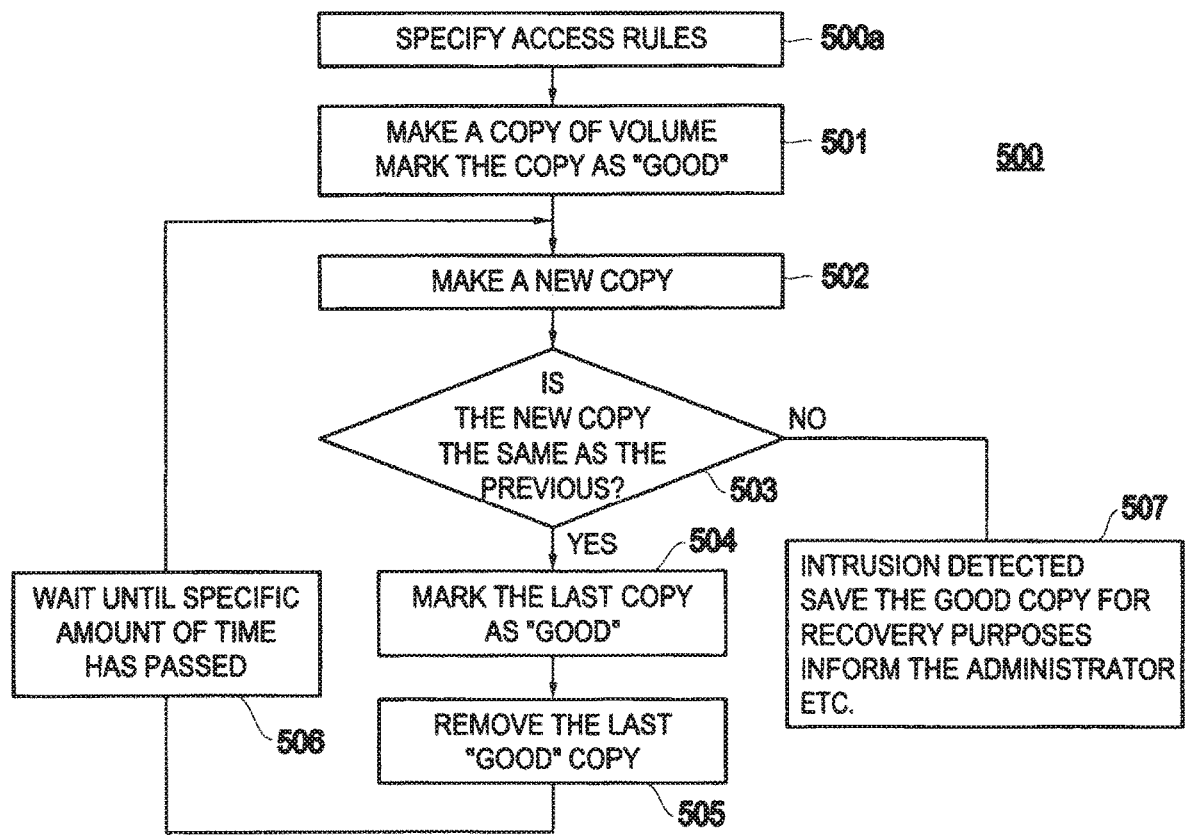
FIG. 5 is a flow diagram illustrating a second exemplary embodiment of the method of the present invention.

FIG. 5 illustrates a method 500 for storage-based intrusion detection according to a second exemplary embodiment of the present invention. In the exemplary embodiment depicted in FIG. 5, the IDS 211 monitors and compares the entire copy 205 of the LUN 203, instead of creating and copying a signature 206 for each LUN 203.

Access rules are defined (step 500a) for one or more files in one or more of the LUNs 203 accessed by the client systems 210. The access rules are defined (step 500a) for the IDS 211 through the secure console 212.

The storage system 201 then makes a copy 205 of each of the LUNs 203 and marks the copy 205 as a "good" copy (step 501). A new copy of the LUN 203 is then made (step 502) and stored in the storage system 201. The new copy is then compared to the previous "good" copy (step 503) to determine if an intrusion has occurred. If, for files which are being monitored, the new copy is identical to the previous "good" copy, then no intrusion has occurred. If the new copy, however, is not identical to the previous "good" copy then an intrusion has occurred.

Once an occurrence of an intrusion, or other unwanted modification, is detected the last "good" copy is saved and the system administrator is informed of the intrusion (step 507). The last "good" copy is saved so that the most recent data having no intrusions can be recovered.

If no intrusions are detected, then the new copy (or most recent copy) is marked as the "good" copy (step 504), The previous "good" copy is then removed from the storage system (step 505). After a specified duration of time, the process is started again (step 506) and another new copy is made and compared to the most recent "good" copy.

In another embodiment of the present invention, the storage system 201 is enhanced to provide an interface through which the intrusion detection and recovery system 211 can obtain a list of modified storage blocks. This can be achieved by providing a module (means) for creating and initializing a bitmap corresponding to all or certain blocks of a LUN 203 where each bit is set when the corresponding block is modified. In such a system, before a new point-in-time copy 205 is created, a list of blocks is created and initialized. After the next point-in-time copy 205 is created the list of modified blocks (blocks modified since the previous copy) is obtained from the storage system. Such bitmaps can be created and kept with minimal impact on the performance of the storage system. The previous embodiments provide methods of intrusion detection at the file level. In this exemplary embodiment, intrusion detection is conducted at the block level.

When a LUN 203 is being examined by the intrusion detection and recovery system, the corresponding bitmap is examined to see what files require examination. Thus, the intrusion detection system 211 can perform a file-to-storage-block translation. The intrusion detection and recovery system 211 can be running on one or more hosts with support for the file systems of interest such that the file to block translation can be performed more easily.

In this exemplary embodiment, files whose corresponding data blocks and metadata blocks are not modified are not checked at all. Those with modified blocks are checked either at file system level or at block level. It should be noted that for a given file, storage blocks to be monitored include not only the data blocks for the file and metadata blocks containing the file information, but also any other block whose modification can lead to a violation of access rules for the file which is being monitored. These include the blocks corresponding to directories in the file path, etc.

In the previous embodiments, the IDS 211 preferably periodically monitors the files of interest on the newly created copy LUNs 205. Thus, the IDS 211 may read the data blocks corresponding to the files (and associated metadata) in order to determine if any intrusions have occurred. Accesses to these blocks share the storage system bandwidth with other systems and therefore reduce the bandwidth available to host systems. Considering the large number of files which are usually monitored, the number of LUNs 203 that the IDS 211 can monitor may be limited. The method according to the present exemplary embodiment minimizes the performance impact of the IDS 211 on the storage system 201 and improves scalability of the IDS 211, considering that most blocks of interest are not regularly modified.

Figure 6:
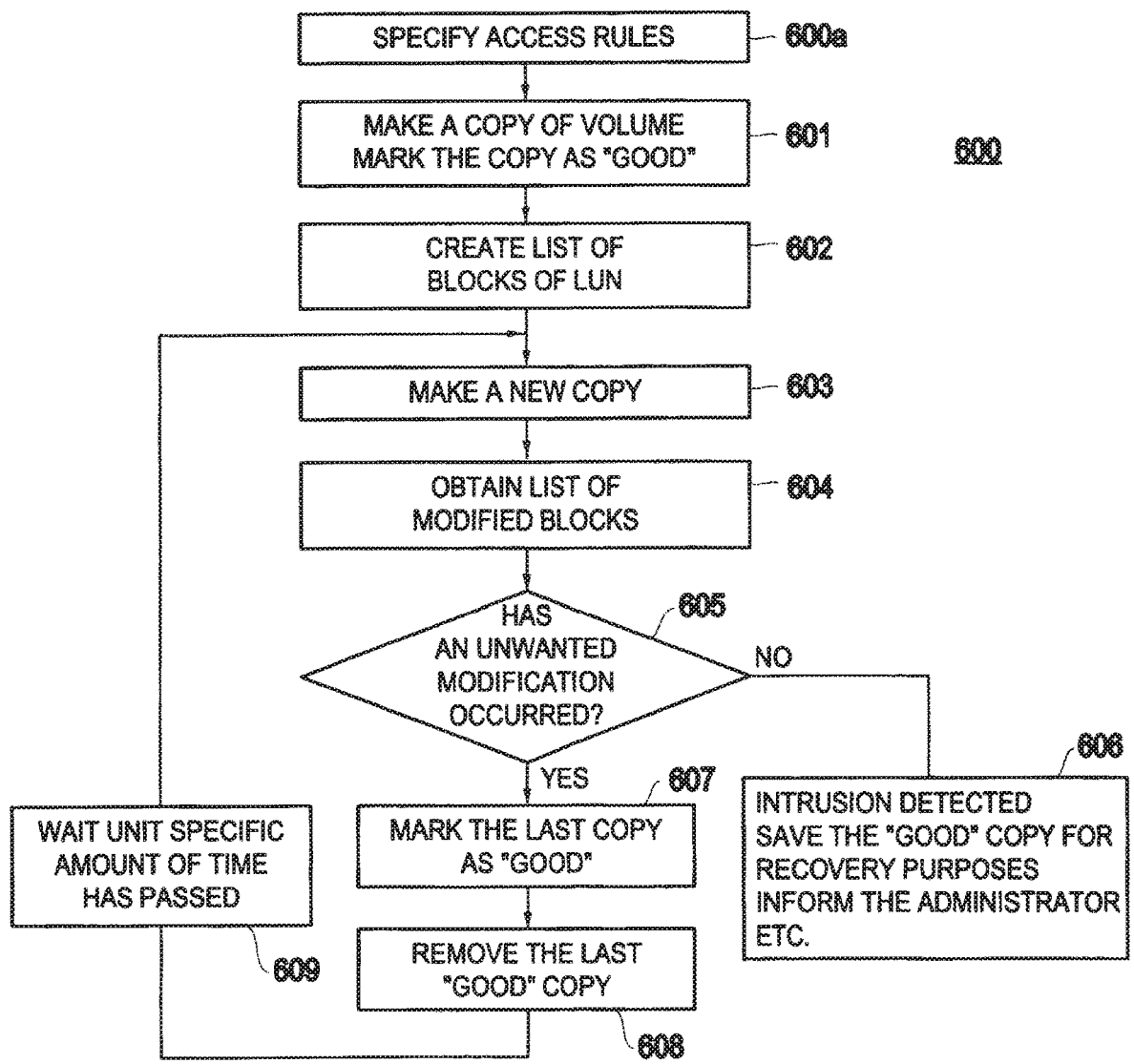
FIG. 6 is a flow diagram illustrating a third exemplary embodiment of the method of the present invention.
Figure 8:
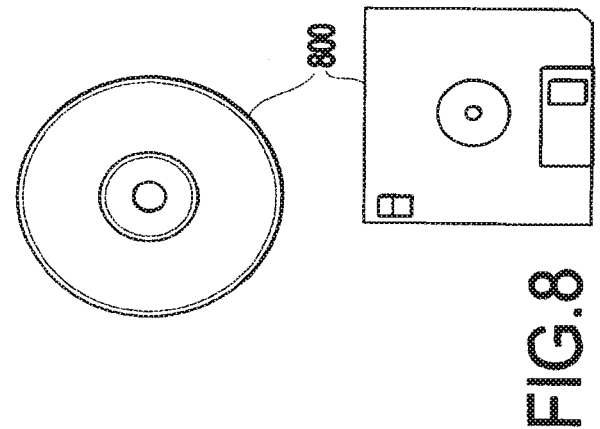
FIG. 8 illustrates a storage medium 800 for storing steps of the program for detecting intrusions to stored data.

FIG. 6 depicts a method 600 of intrusion detection according to this exemplary embodiment of the present invention. Access rules are defined (step 600a) for one or more files in one or more of the LUNs 203 accessed by the client systems 210. The access rules are defined 600 for the IDS 211 through the secure console 212.

The storage system 201 then makes a copy 205 of each of the LUNs 203 and marks the copy 205 as a "good" copy (step 601). The storage system 201 then creates a list of blocks (bitmap) (step 602) of the LUN 203. A new copy of the LUN 203 is then made (step 603) and stored in the storage system 201. The IDS 211 then obtains a list of modified blocks (step 604) in the new copy of the LUN 203. The IDS 211 determines which blocks have been modified by referencing the list. The IDS then compares the modified blocks in the new copy to the corresponding blocks in the previous "good" copy to determine if an intrusion has occurred (step 605).

Once an occurrence of an intrusion, or other unwanted modification, is detected the last "good" copy is saved and the system administrator is informed of the intrusion (step 606). The last "good" copy is saved so that the most recent data having no intrusions can be recovered.

If no intrusions are detected, then the new copy (or most recent copy) is marked as the "good" copy (step 607). The previous "good" copy is then removed from the storage system (step 608). After a specified duration of time, the process is started again (step 609) and another new copy is made and compared to the most recent "good" copy.

Figure 7:
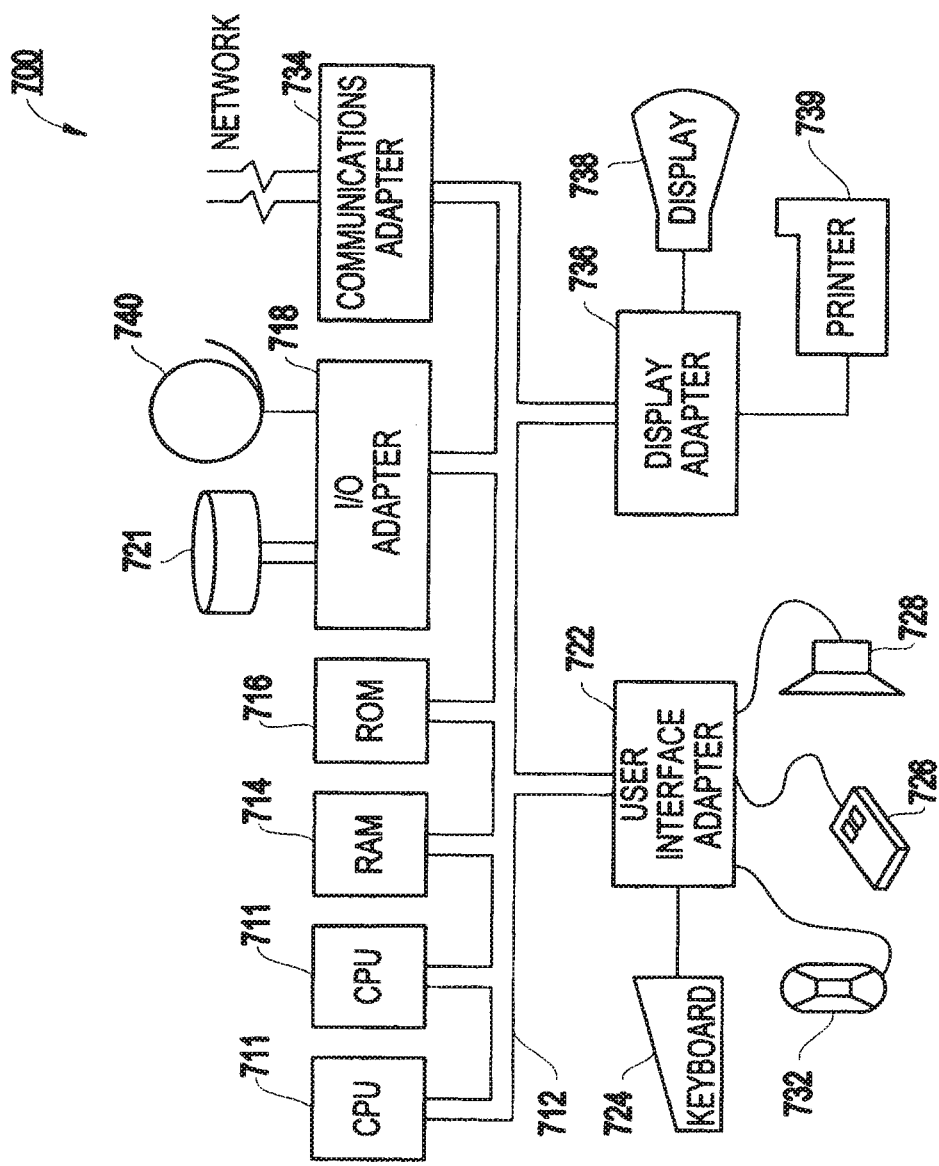
FIG. 7 illustrates a block diagram of the environment and configuration of an exemplary computer system 700 for incorporating the present invention.

FIG. 7 shows a typical hardware configuration of an information handling/computer system 700 in accordance with the invention that preferably has at least one processor or central processing unit (CPU) 711. The CPUs 711 are interconnected via a system bus 712 to a random access memory (RAM) 714, read-only memory (ROM) 716; input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface devices to the bus 712), communication adapter 734 (for connecting an information handling system to a data processing network, the Internet, an Intranet, a personal area network (PAN), etc.), and a display adapter 736 for connecting the bus to a display device 738 and/or printer 739 (e.g., a digital printer or the like).

As shown in FIG. 7, in addition to the hardware and process environment described above, a different aspect of the invention includes a computer implemented method for detecting intrusions to stored data. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the present invention.

This signal-bearing media may include, for example, a RAM (not shown) contained in the CPU 711, as represented by the fast-access storage, for example. Alternatively, the instructions may be contained in another signal-bearing media, such as a magnetic tape storage diskette or CD diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM or EEPROM), an optical storage device (e.g., CD-ROM, WORM, DVD, digital optical tape, etc.), or other suitable signal-bearing media including transmission media such as digital and analog and communication links and wireless. In an illustrative embodiment of the invention, the machine-readable instructions may comprise software object code, compiled from a language such as "C", etc.

As discussed above in the exemplary embodiments, the intrusion detection method and system provides computer system protection from manipulation of stored data. By enabling the IDS to operate at file system level and independent of the host system, the present invention provides an intrusion detection and recovery method (and system) which improves performance and scalability for storage systems. Furthermore, unlike conventional intrusion detection models, the present method and system for detecting intrusions may use point-in-time copies to improve the time and space efficiency of the intrusion detection method.

It should be noted that the present invention covers detection and recovery from any unwanted changes to the content of a storage system whether it has occurred because of an intrusion or not. Other possible sources of unwanted changes include, but are not limited to, mistakes and erroneous commands made by users and system administrators, intentional changes by a disgruntled user, hardware malfunction, etc.

These exemplary techniques have been discussed exemplarily in the context of SANs, but can also be used for local machines (host-based) as well, e.g., hard disks, local memories, and Network Attached Storage (NAS).

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. An intrusion detection and recovery system, comprising:
   a copying module that creates a point-in-time copy of a storage level logical unit, said point-in-time copy comprising a volume copy of said storage level logical unit and signatures of said storage level logical unit;
   a comparison module that compares at least a portion of said point-in-time copy with a previous copy of the storage level logical unit;
   a judging module that, based on results of said comparison module, judges if a modification has occurred,
      wherein a signature of said point-in-time copy is compared with a signature of said previous copy to detect a sign of an intrusion, and
      wherein the signatures of said storage level logical unit for files of interest are created based on access rules that identify files of said storage level logical unit that are monitored in said point-in-time copy; and
   a defining module that defines the access rules to identify the files of said storage level logical unit that are monitored in said point-in-time copy,
   wherein the access rules define types of actions that are allowed to be performed on the files of said storage level logical unit and types of actions on the files of said storage level logical unit that are to be treated as the intrusion, and
   wherein the signatures of said storage level logical unit comprise encoded data of files of said storage level logical unit that are monitored in said point-in-time copy.

2. The intrusion detection and recovery system according to claim 1, further comprising:
   a removing module that, when the intrusion has been judged, removes said point-in-time copy and saves said previous copy of the storage level logical unit for data recovery.

3. The intrusion detection and recovery system according to claim 2, further comprising:
   a marking module that, when the modification has not been judged, marks said point-in-time copy as a good copy and removes said previous copy of the storage level logical unit.

4. The intrusion detection and recovery system according to claim 3, further comprising:
   a preventing module that prevents changes on certain logical blocks of stored data to take place when the changes violate predefined rules.

5. The intrusion detection and recovery system according to claim 1, wherein the encoded data comprise encoded metadata of files of said storage level logical unit that are monitored in said point-in-time copy.

6. The intrusion detection and recovery system according to claim 1, further comprising:
a preventing module that prevents changes, occurring based on said modification, on certain logical blocks of stored data to take place when the changes violate predefined rules.

7. A storage system, comprising:
at least one data storage unit;
an intrusion detection and recovery system that detects an intrusion at a file system level by creating a point-in-time copy of a storage level logical unit, said point-in-time copy comprising a volume copy of said storage level logical unit and signatures of said storage level logical unit;
a unit that compares at least a portion of said point-in-time copy and said storage level logical unit information with a previous copy of said storage level logical unit; and
a unit that judges, based on results of said unit that compares, if a modification has occurred,
wherein a signature of said point-in-time copy is compared with a signature of said previous copy to detect a sign of an intrusion, and
wherein the signatures of said storage level logical unit for files of interest are created based on access rules that identify files of said storage level logical unit that are monitored in said point-in-time copy; and
a unit that defines the access rules to identify the files of said storage level logical unit that are monitored in said point-in-time copy,
wherein the access rules define types of actions that are allowed to be performed on the files of said storage level logical unit and types of actions on the files of said storage level logical unit that are to be treated as the intrusion, and
wherein the signatures of said storage level logical unit comprise encoded data of files of said storage level logical unit that are monitored in said point-in-time copy.

8. The storage system according to claim 7, further comprising:
a management console that controls an operation of said intrusion detection and recovery system.

9. The storage system according to claim 8, wherein said intrusion detection and recovery system, said management console, and said point-in-time copy of the storage level logical unit are maintained in a secure perimeter, and
wherein said secure perimeter is accessible only by a storage system administrator.

10. The storage system according to claim 7, further comprising:
a unit that, when the intrusion has been judged, removes said point-in-time copy and saves said previous copy of the storage level logical unit for data recovery.

11. The storage system according to claim 10, further comprising:
a unit that, when the modification has not been judged, marks said point-in-time copy as a good copy and removes said previous copy of the storage level logical unit.

12. The storage system according to claim 11, further comprising:
a unit that prevents changes on certain logical blocks of stored data to take place when the changes violate predefined rules.

13. The storage system according to claim 7, wherein said previous copy of the storage level logical unit comprises an original copy of the storage level logical unit.

14. The storage system according to claim 7, further comprising:
a unit that prevents changes on certain logical blocks of stored data to take place when the changes violate predefined rules, the changes occurring based on said modification.

15. A computer system, comprising:
at least one client machine; and
a storage system, said at least one client machine being connected to said storage system, said storage system comprising:
at least one data storage unit;
an intrusion detection and recovery system that detects an intrusion at a file system level by creating a point-in-time copy of a storage level logical unit, said point-in-time copy comprising a volume copy of said storage level logical unit and signatures of said storage level logical unit;
a unit that compares at least a portion of said point-in-time copy and said storage level logical unit information with a previous copy of said storage level logical unit; and
a unit that judges, based on results of said unit that compares, if a modification has occurred,
wherein a signature of said point-in-time copy is compared with a signature of said previous copy to detect a sign of an intrusion, and
wherein the signatures of said storage level logical unit for files of interest are created based on access rules that identify files of said storage level logical unit that are monitored in said point-in-time copy; and
a unit that defines the access rules to identify the files of said storage level logical unit that are monitored in said point-in-time copy,
wherein the access rules define types of actions that are allowed to be performed on the files of said storage level logical unit and types of actions on the files of said storage level logical unit that are to be treated as the intrusion, and
wherein the signatures of said storage level logical unit comprise encoded data of files of said storage level logical unit that are monitored in said point-in-time copy.

16. The computer system according to claim 15, wherein said previous copy of the storage level logical unit comprises an original copy of the storage level logical unit.

17. The computer system according to claim 15, wherein said intrusion detection and recovery system, said management console, and said point-in-time copy of the storage level logical unit are maintained in a secure perimeter, and
wherein said secure perimeter is accessible only by a storage system administrator.

18. The computer system according to claim 15, wherein said storage system further comprises:
a unit that, when the intrusion has been judged, removes said point-in-time copy and saves said previous copy of the storage level logical unit for data recovery.

19. The computer system according to claim 18, wherein said storage system further comprises:
a unit that, when the modification has not been judged, marks said point-in-time copy as a good copy and removes said previous copy of the storage level logical unit.

20. The computer system according to claim 19, wherein said storage system further comprises:
a unit that prevents changes on certain logical blocks of stored data to take place when the changes violate predefined rules.

* * * * *